United States Patent Office 3,085,986
Patented Apr. 16, 1963

3,085,986
COMPOSITION COMPRISING A LOW VISCOSITY STYRENE-MALEIC ANHYDRIDE COPOLYMER AND A POLYHYDRIC ALCOHOL
Irving E. Muskat, Miami, Fla., assignor, by mesne assignments, to Sinclair Research, Inc., a corporation of Delaware
No Drawing. Filed Oct. 30, 1959, Ser. No. 849,705
28 Claims. (Cl. 260—31.8)

The present invention relates to new low pressure molding compositions containing a mixture of polyhydric alcohol having at least one primary hydroxyl group and a solid, linear low molecular weight copolymer of maleic anhydride and styrene which is cross-linked by said alcohol.

This application is a continuation-in-part of my prior application Serial No. 637,855 filed February 4, 1957, allowed May 12, 1959, and now abandoned.

The copolymers which are employed in accordance with the invention are normally solid copolymers of styrene and maleic anhydride in molar proportions of from 1:2 to 2:1, preferably in molar proportions of substantially 1:1 characterized by a solution viscosity at 25° C. in concentration of 10 grams of polymer dissolved in acetone to form 100 milliliters of solution of up to 7 centistokes, preferably up to 1 centistoke. Such a solution is hereafter referred to as a 10% solution of polymer in acetone.

Preferred copolymers in accordance with the invention are further characterized by melting points below 255° C. and more preferably below 225° C. Moreover, preferred copolymers melt (final readings made on a sample previously fused in the apparatus) over a range of less than 15° C. Melting points and melting range were determined using the Fisher-John's melting point apparatus as described in the publication "Modern Laboratory Appliances" published by the Fisher Scientific Company in its publication number 111 at page 575. Molecular weight measurements by boiling point elevation technique indicate that copolymers produced in accordance with the invention frequently have molecular weights of less than 3000, preferably less than 2000.

Copolymers of the type contemplated are desirably prepared by copolymerization in solution in an organic solvent which is a non-solvent for the polymers and which functions to limit molecular weight by solvent termination. Thus, the copolymers are preferably terminated by an organic compound which comprises a monocyclic hydrocarbon nucleus of 6 carbon atoms substituted with at least one alkyl radical containing at least two carbon atoms and in which the alpha carbon atom of the alkyl radical contains at least one hydrogen substituent. These terminating compounds are preferably illustrated by an isopropyl benzene such as cumene or cymene and, in many instances, the terminating compound is combined into the copolymer in amounts of from 2–12% by weight.

Referring more particularly to the production of preferred copolymers of styrene and maleic anhydride which may be used in accordance with the invention, reference is made to my co-pending application Serial No. 637,890 filed February 4, 1957, allowed May 20, 1959, and now abandoned, and also to a companion application Serial No. 849,706 filed of even date herewith which replaces said application Serial No. 637,890. The disclosures of these applications are hereby incorporated by reference.

Briefly stated, in accordance with the disclosures of these applications, styrene and maleic anhydride in molar proportions of about 1:2 to about 2:1 are dissolved, together with a free-radical generating polymerization catalyst, in certain selected solvents in which the monomer reactants are soluble but in which the copolymer product is insoluble and which function to terminate the copolymerization reaction. Heat is then employed to initiate an exothermic polymerization reaction, temperatures of from 75–200° C. being broadly suitable. The temperature of reaction is selected to prevent fusion and agglomeration of precipitated copolymer particles which would produce a porous mass which strongly resists stirring and which may entrap large proportions of reaction liquid. Such fusion and agglomeration of precipitated particles in accordance with the invention is avoided either by maintaining the temperature of reaction below the point at which any substantial proportion of precipitated copolymer will fuse to cause agglomeration or by conducting the polymerization reaction at a temperature which will melt any precipitated copolymer providing a molten mass which can be effectively agitated.

The copolymers which are used in the invention may be produced by what is termed an enmasse procedure. In the enmasse polymerization procedure, the maleic anhydride and styrene monomers together with up to about 1% by weight of benzoyl peroxide or corresponding proportion of other free-radical generating polymerization catalyst are dissolved in certain selected organic solvents and the entire solution is subjected to polymerization as a single unit.

Dissolving is effected at a temperature at which no significant polymerization can take place, e.g., less than about 75° C. The solution so produced is placed in a reaction vessel and heated to a temperature of about 75–80° C. to initiate the polymerization reaction. This polymerization reaction is strongly exothermic and becomes more rapid with increasing reaction temperature. Agitation and cooling are employed to prevent the reaction from becoming uncontrollably explosive. As the reaction proceeds the proportion of unreacted monomers remaining in the reaction liquid is reduced and the temperature is desirably permitted to increase, care being taken to regulate the temperature carefully to prevent it from getting out of hand. At the start of the reaction, and especially when the solvent medium contains more than 10% by weight of monomers, temperatures above 90° C. are dangerous. After some substantial precipitation of polymer has occurred, the temperature may be permitted to rise to about 110° C. After the exothermic reaction has subsided, it is desirable to continue heating to obtain high conversion and this may be achieved using temperatures in the range of 80–135° C., depending upon the nature of the solvent. Preferably, the more elevated temperatures of 125–135° C. are used and heating is desirably applied for a period of from 1 to 3 hours after the exotherm has subsided.

It is desired to point out that the enmasse reaction procedure is not the preferred procedure. Among the solvents which may be selected in accordance with the invention is the least preferred solvent, ethylbenzene. Using the enmasse reaction procedure and ethylbenzene as solvent, the molecular weight of the product is lowered far below that conventionally achieved by the prior art using, for example, benzene or xylene, but the product produced enmasse using ethylbenzene merely represents the approximate upper limit of feasibility in accordance with the invention. Far superior results are achieved using either the various other solvents which may be selected in accordance with the invention and/or by employing the unique incremental addition procedure which will now be described.

In accordance with preferred practice, catalyst and monomer reactants are simultaneously supplied to a reaction vessel containing a portion of the selected solvent at the reaction temperature and at a rate not substantially in excess of the rate of conversion of monomer to polymer. This is preferably effected by addition of a solution containing catalyst and monomer reactants all dissolved in the selected solvent. However, if desired, the monomers can be dissolved in one portion of selected solvent and the catalyst dissolved in a second portion of selected solvent and both solutions supplied simultaneously to the reaction vessell containing selected solvent at reaction temperature. In this way, the monomer-containing solution is more stable and may be supplied at a temperature different from the temperature of the catalyst-containing solution, e.g., the catalyst-containing solution may be supplied at a low temperature where it is more stable and the monomer-containing solution may be supplied at a higher temperature where the selected solvent can tolerate a higher proportion of dissolved monomers. Indeed, in view of the fact that the monomer-containing solution in preferred practice of the incremental addition process is supplied to a large volume of vigorously agitated selected solvent containing a minimum proportion of unreacted monomers and maintained at very elevated temperatures, substantially instantaneous solution of monomers in the selected solvent within the reaction vessel becomes feasible and the monomer-containing solution may contain suspended monomers, particularly suspended maleic anhydride. Indeed, since maleic anhydride is quite soluble in styrene, the maleic anhydride may be dissolved in the styrene and supplied without predissolving of these monomers in the selected solvent. To insure uniform and substantially instantaneous admixture of catalyst in the reaction liquor and as a safety precaution, the catalyst, particularly if it is slow dissolving, is desirably first dissolved in a portion of the selected solvent. Of course, as stated above, the catalyst may be dissolved in the reactive ingredients or added separately but simultaneously to the reaction vessel.

The organic solvent selected in accordance with the invention comprises a monocyclic hydrocarbon nucleus of six carbon atoms substituted with at least one alkyl radical containing at least two carbon atoms and in which the alpha carbon atom of the alkyl radical contains at least one hydrogen substituent. The solvent should be capable of dissolving under the conditions of reaction the styrene and maleic anhydride monomer components and incapable of dissolving the styrene-maleic anhydride copolymer in appreciable quantities. Moreover, the organic solvent should be free of such unsaturation enabling copolymerization with styrene or maleic anhydride and the cyclic hydrocarbon nucleus should be free of substituents reactive with the styrene or maleic anhydride monomers under the conditions of polymerization.

The preferred monocyclic hydrocarbon nucleus is a benzene nucleus and derivatives of benzene such as ethylbenzene or cumene are preferred in comparison with non-aromatic compounds such as p-menthane or p-menthene which are usable in accordance with the invention.

Among the aromatic derivatives which may be selected, it is particularly preferred to employ isopropyl-substituted benzenes such as cumene and the various cymenes, e.g., o-, m-, and p-cymenes alone or in admixture with one another. The alkyl-substituted benzenes which may be selected are not restricted to monoalkyl-substituted products. Thus, diisopropyl benzene and triisopropyl benzene are illustrative of polyalkyl-substituted benzenes which may be used. The solvents are also not limited to alkyl-substituted compounds. Thus, 4-methoxy-1-isopropyl benzene and 4-butoxy-1-isopropyl benzene may be used. Aromatic substituents may also be present as in the compounds diphenyl methane and diphenyl ethane (both sym. and unsym.). The substitution of the monocyclic hydrocarbon nucleus is not limited to carbon, hydrogen and oxygen and other saturated substituents which are not reactive under the conditions of polymerization with the styrene and maleic anhydride monomers may be used. For example, halogen, containing compounds such as monochloro cymene, monofluoro cymene or monobromo cymene may be selected. Still other functional groups may be tolerated such as nitro derivatives, e.g., 4-isopropyl-1-methyl-2-nitro benzene.

Preferred solvents have the following structural formula

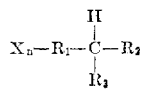

in which: $R_1$ represents a monocyclic hydrocarbon having six carbon atoms in the ring structure; $R_2$ is an alkyl, aryl or alkaryl radical in which the alkyl carbon chain contains from one to four carbon atoms; $R_3$ is hydrogen or an alkyl radical of from one to four carbon atoms; X is a substituent inert to styrene and maleic anhydride under the conditions of polymerization (preferably selected from the group of halogen, nitro radicals, alkyl radicals containing up to five carbon atoms and alkoxy radicals containing up to five carbon atoms); and $n$ in an integer from 0–5.

Using the incremental reaction procedure with solvents having chain-terminating activity, particularly at polymerization temperatures in excess of 100° C. (especially at temperatures above the melting point in the solvent medium of the copolymer which precipitates) and more particularly in the presence of from 2–10% by weight of benzoyl peroxide or corresponding equivalent proportion of other free-radical generating polymerization catalyst, the copolymer product is characterized by lower solution viscosity in acetone and by improved uniformity and is superior in admixture with polyhydric alcohols in accordance with the invention.

The molar ratio of styrene to maleic anhydride may vary considerably while still producing a copolymer in which the molar ratio of styrene and maleic anhydride is substantially 1:1. Preferably, the molar ratio of styrene and maleic anhydride monomers is substantially 1:1 although a molar excess of up to about 5% of styrene relative to maleic anhydride is desirably present.

Low pressure molding compositions which are readily fusible during the forming and liquefaction stages of heating and which can be thermoset to cross-linked infusible products by high speed modern molding production methods have long been sought in the art. Particularly in the commercial manufacture of large molded products such as tanks, cabinets, boats, furniture, auto bodies, etc., the molding procedures have been restricted because of the limitations inherent in the materials available to the industry.

The older thermosetting resins, such as urea-formaldehyde, melamine-formaldehyde and phenol-formaldehyde resins have been limited due to the high pressures required to mold them. The newer low pressure alkyd and polyester resins are limited because the methods of fabrication suitable for these low pressure resins are slow and time consuming.

These conventionally employed low pressure resins of the alkyd and polyester types are essentially liquid, polymerizable, unsaturated casting resins in which the catalytic polymerization of these resins takes place in the mold, preferably at a low temperature and over a long period of time to obtain optimum physical properties and freedom from defects such as air bubbles, blisters, drainage, cracks, etc.

The problem of the plastics industry has been that high speed methods—compression, injection, and transfer molding—have been developed for the high pressure resins; while the suitable methods for the low pressure resins are slow and cumbersome. What has been sought is the development of a low pressure resin for which the already known and established high speed methods of molding are applicable.

The prior art styrene-maleic anhydride copolymers are not well adapted for use as components of molding compositions due to their excessive and frequently non-uniform molecular weight manifested by high solution viscosity. As a result of excessive solution viscosity, mixtures of the prior copolymers with glycols require molding pressures of the order of 1000 to 3000 p.s.i. and higher using temperatures of the order of 130–200° C. and are further characterized by poor flow. Lack of molecular weight uniformity is further detrimental since it leads to non-uniform flow and non-uniform reaction with glycols and this further limits the utility of prior copolymers for molding purposes.

The maleic anhydride-styrene copolymers which have been described and which are characterized by a solution viscosity in 10% acetone solution of up to 7 centistokes, preferably up to 1 centistoke, are easily moldable in admixture with polyhydric alcohols such as glycols at pressures of the order of about 10–100 p.s.i., using temperatures in the range of 130–200° C. The uniformity of low molecular weight of the styrene-maleic anhydride copolymers specified is particularly beneficial since such uniform products possess uniform flow properties which is of importance to commercial molding procedures.

The molding powder mixtures of the present invention are essentially dry or, at most, somewhat pasty, and provide an easily handled finely divided solid composition which is surprisingly effective to bring about in situ cross-linking of the reactive components under low pressure molding conditions.

During the normal low pressure molding cycle the styrene-maleic anhydride copolymer is cross-linked to a large extent by the polyhydric alcohol. The preferred cross-linking agent is a glycol, preferably a glycol solid at room temperature, which is present in stoichiometric proportions for complete reaction with said copolymer.

In the admixture of the separate reactive components, it is desirable that the cross-linking agent and copolymer be stable and inert towards each other during ordinary storage for extended periods of time. At elevated temperatures, the fusing of the lower melting component and the solubility of the components in each other provide a mobile liquid at very low pressures, of the order of about 20 pounds or even less, to completey fill the mold cavity or form. These ingredients being soluble in the molten state with each other, flow readily and fill the mold cavity while at the same time undergoing a controlled, rather rapid resinification reaction to form a thermoset infusible product of highly desirable physical and chemical properties and which is substantially uniform throughout all portions of the formed molded product.

In accordance with the invention, there is provided a stable, uniform admixture of styrene-maleic anhydride copolymer and polyhydric alcohol cross-linking reactant, which is capable of storage in the unreacted condition for long periods of time and which can be quickly molded at low pressure and under heat to form uniformly cured and shaped products.

The molding compositions of the invention are adapted to be fused and molded at low pressures without evolving volatile components and may be compression or transfer molded by usual methods to provide products which may have a surface area of 50 to 100 times that which is feasible using phenolic or urea resins. Conversely, simple air-cylinder presses and low cost tooling may be used in place of heavy duty and expensive hydraulic presses presently required. The invention includes the provision of stable mixtures of copolymer and polyhydric alcohol which can be quickly molded at low pressures and under heat to produce uniform cured and shaped products. Other and further objects of the invention will appear hereinafter.

The polyhydric aliphatic alcohol cross-linking reactant is preferably an alcohol which contains at least one primary hydroxyl group in order to achieve a sufficiently rapid cross-linking cure with the copolymer. Employing polyhydric alcohol containing only secondary hydroxyl groups, for example, 2,3-butylene glycol, the rate of cross-linking is slower and the alcohol is more inert. Higher molding temperatures as well as a longer molding cycle serve to compensate for the slower rate.

It is desirable that the polyhydric alcohol be relatively unreactive with the copolymer at temperatures below the optimum temperature for good fusion and flow of the molding composition under low pressure molding conditions and in a temperature range of from 130° C. to about 210° C.

It has been found that aliphatic polyhydric alcohols which are solid at temperatures of about 15° C. or greater possess sufficient inertness toward the copolymer ingredient to satisfy the requirements for mixing the composition as by ball milling, storage for extended periods of time at room temperature and up to about 40° C. and stability for handling during molding operations to permit controlled fast cure within a narrow temperature molding range while exhibiting the necessary flow characteristics during fusion.

Cross-linking of the polyhydric alcohol and copolymer begins to take place without any induction period as soon as the components begin to fuse and flow together. The rate of cross-linking which occurs depends upon the ease of fusibility of the molding composition at the selected temperature and upon the reactivity of the polyhydric alcohol toward the copolymer.

Such polyhydric alcohols as 1,4-butanediol react so fast in the cross-linking reaction that it is desirable to close the mold rapidly to insure that the composition has been flowed and shaped to the desired extent before irreversible solidification and sintering due to cross-linking takes place. In this case, it is desirable to lower the temperature (110° C. is feasible) to provide a slower rate of cross-linking consistent with good fusion and flow of the intermingled ingredients to produce good results. This alcohol thus provides a fast molding cycle and care is needed to avoid producing a sintered rather than a fused molded product.

Other glycols react somewhat slower. Thus, ethylene glycol cross-links at a moderate rate in comparison with 1,4-butanediol. Such glycols as trimethylolethane, trimethylolpropane, neopentyl glycol, propylene glycol, diethylene glycol, polypropylene glycols, polyethylene glycol, 1,5, pentane diol and hexylene glycol (2 methyl-2,4-pentanediol) cross-link with the copolymer prepared in accordance with the invention at a rate which is less than that of the fastest material, 1,4-butanediol and greater than that of the slowest material, 2,3-butanediol.

It has been found that the admixture of the copolymer with substantial amounts of liquid hydroxy compounds containing a primary hydroxyl group such as ethylene glycol and its polyglycols having up to 10 glycol units, propylene glycol and its polyglycols with up to 10 glycol units, 1,4-butanediol, glycerol, 1,5-pentanediol, etc., tend to react with the styrene-maleic anhydride copolymer at room temperature within 3–6 days and thus do not completely satisfy the high requirements for a one package system.

In contrast, a mixture of 2,3-butylene glycol and the styrene-maleic anhydride copolymer prepared in an ethylbenzene solvent is stable for several months at room temperature but reacts slowly at molding temperature.

More reactive cross-linking alcohols may be used in accordance with the invention by blending the ingredients in accordance with the invention just prior to carrying out the low pressure molding operation. This two step operation of blending and molding is suitable for some but not all operations.

Especially preferred for the two step operation is a formulation of 1,4-butanediol (23 parts) and the maleic anhydride-styrene copolymer (100 parts).

To satisfy the stringent commercial requirements for a single package molding composition, which is inert at ordinary temperatures and which is capable of storage for prolonged periods, it is necessary to balance the opposing factors of high cross-linking rate with good flow at elevated temperatures above the fusing temperature of the composition with the reactivity of the alcohol toward the polymer at ordinary temperatures. This balance is attained by such polyhydroxy cross-linking reactants as trimethylolethane (TME), trimethylolpropane (TMP), neopentlyglycol (NEO) and mannitol. Pentaerythritol requires a high temperature for fusibility and can be used.

All of the above-mentioned glycols of the aliphatic series, their homologues and analogues, or mixtures of these glycols, are effective co-reactive cross-linking ingredients in admixture with the copolymers described herein and claimed in my aforesaid applications, to provide useful and commercially desirable, infusible molded products by high speed modern molding production methods at low pressures, say from 20 to about 100 pounds per square inch, at temperatures slightly above the lowest melting temperature of the polyhydric alcohol copolymer admixture.

The polyhydric alcohol cross-linking reactant in admixture with the styrene-maleic anhydride copolymer is sometimes not sufficiently fluid at very low pressures to give the most satisfactory molded products as may be required. It is therefore desirable to add a suitable plasticizer which increases the fusibility and fluidity of the molding composition under molding conditions of low pressure and above the fusing temperature.

In general the plasticizers employed are sufficiently non-volatile to be retained during molding and may include non-reactive solvents for the copolymer and polyhydric alcohol components. With both the reactive and non-reactive solvent plasticizers, it has been found that in amounts as little as 5% by weight of the molding composition and up to about 75% by weight, significant improvement in flow characteristics of the fused composition under low pressure molding conditions is observed. Increasing the amount of plasticizer in general improves the fluidity under low pressure of the fused liquid composition.

Typical plasticizers of the non-reactive solvent type include the following: cyclohexanone, isophorone, acetonaphthone, methyl isopropenyl ketone dimer, acetophenone, etc.

Typical reactive plasticizers are the amides such as formamide, dimethylformamide, acetamide, para- and ortho-toluene sulfonamides, etc.

Half esters of dicarboxylic aliphatic acids may be used as plasticizers. The acids may be oxalic, succinic, maleic, fumaric, adipic and the like. The half esters are of a lower monohydric alcohol and are particularly useful. Alkyl hydrogen maleates are preferred as the plasticizers in this category because of their good solubility behavior with both the alcohol and the copolymer. The alkyl group of this plasticizer is preferably lower alkyl, such as methyl, ethyl, propyl, butyl, isoamyl, hexyl, or octyl.

The above mixed copolymer resin and reactive alcohol compositions, especially those containing neopentyl glycol, trimethylol ethane or trimethylol propane can be readily dissolved in a suitable organic solvent such as acetone, and employed as a sizing or adhesive impregnating solution to impregnate woven or weftless fabrics such as cloth, fiber mats, fibrous batts, and other porous materials. The cloth, mats and fibers can be made from natural fibers such as cotton, jute, sisal, etc., or from synthetic fiber such as glass, rayon, nylon, Dacron, cellulose acetate, cellulose ether, "Fortisan," etc.

The solvent is removed (preferably at a temperature above the dew point of water) and below the reaction temperature and the impregnated material may then be readily molded or laminated at relatively low pressures up to about 100 pounds per square inch to provide reinforced products having utility as structural members and for other purposes.

For various applications in non-molding uses as, for example, in paints, heat-setting lacquers, etc., it may be desirable to use ordinary compatible ester type plasticizers or mixtures of these with the above. The use of the foregoing plasticizers markedly improves the flow of characteristics of the resin in solution.

The solvent solution of the resin-containing compositions of the invention may also be used for paints, enamels and dispersed coating compositions in which heat is used to speed the cure after the solvent has vaporized, to leave the reactive resin coating on the base. Heating may be by baking as with metal finishes or by means of infra-red lamps or by induction heating, etc.

In the field of solution coatings, the copolymers of the invention, by virtue of their acid anhydride reactivity, constitute valuable components of coating compositions in which they may be dissolved in various solvents. Acetone, methyl ethyl ketone, cyclohexanone, acetophenone, isophorone and dimethyl formamide are particularly effective solvents for the copolymers of the invention. The lower and more uniform molecular weight of the copolymers of the invention enables improved stability and compatibility in solution and solutions of higher solids content at any given viscosity.

In formulating molding compositions in accordance with the invention, fillers up to about 65% by weight may be added without impairing the molding characteristics. However, with fillers in an amount greater than 35% and up to 75% and more which are mixed with the molding powders, it may be necessary to employ higher pressures. Suitable fillers are calcium carbonate, clay, talc, asbestos, cotton floc, silica, wood flower, cellulose, milled and chopped glass fibers, etc. Other fillers which may function also as pigments may be used. Mixtures of the foregoing can also be used. In a specific application, if too much filler is used, it will be found that a higher pressure may be required for molding.

Lubricants, such as silicone oils, zinc stearates, aluminum stearates, etc., can be added to the molding composition of the invention, generally in amounts of 1–5% by weight of the molding composition, in order to facilitate high speed molding production.

Copolymers of styrene and maleic anhydride which may be used in the invention and the production thereof are illustrated in the following examples, all parts and percentages being by weight.

EXAMPLE I (ENMASSE)

A solution containing maleic anhydride and styrene monomers dissolved in technical grade ethylbenzene in equimolar proportions and at 20% solids and containing 0.25 part of benzoyl peroxide per 100 parts of total monomers was slowly heated with good agitation in a flask provided with a stirrer, a thermometer and a reflux condenser to 85° C. After an induction period of 10–15 minutes a cloud formed and precipitation of heteropolymer increased along with the development of an exothermic reaction. Heating was then stopped and cooling applied to maintain a temperature of 85° C. to thereby prevent an explosive reaction. When the exotherm subsided, the mixture was heated to 105° C. for 3 hours. The mixture was then cooled, filtered to remove heteropolymer and dried to provide a yield of 96%+.

EXAMPLE II (ENMASSE)

Example I was repeated using cumene instead of ethylbenzene. After the exotherm had subsided the mixture was heated and maintained in the range of 105–120° C. for 2 hours. The mixture, after cooling, filtering to remove heteropolymer product and drying, produced a yield of 97%+.

EXAMPLE III (INCREMENTAL)

A kettle of 30 gallon capacity and provided with agitation equipment and a jacket adapted to provide heating or cooling was charged with approximately 7 gallons of cumene, and the kettle contents heated and maintained at a temperature of approximately 108° C.

In a separate tank approximately 17.6 pounds of maleic anhydride briquettes were dissolved in approximately 13 gallons of cumene. The maleic anhydride-cumene solution was heated to approximately 53° C. and upon disappearance of the briquettes the solution was filtered and approximately ¾ pound of insoluble maleic acid was recovered. Approximately 18.3 pounds of styrene monomer were added to the clear filtrate representing approximately 1% excess by weight over a 1:1 molar ratio of styrene to maleic anhydride. After stirring to produce a homogeneous solution and cooling to 48° C., 390 grams of benzoyl peroxide were added and dissolved by stirring to provide approximately 2.4% benzoyl peroxide by weight of total monomers present.

The resulting monomer-containing solution was metered into the 30 gallon reaction kettle at a rate of about 0.26 gallon per minute. There was substantially no induction period. After about 20–24 minutes of substantially continuous addition of monomer-containing solution, the "pot temperature" leveled off to a running temperature in the range of 115–120° C. The time for addition of approximately 15 gallons of monomer-containing solution was about 68 minutes. Heating and agitation of the reaction mixture were continued for an additional hour while maintaining the "pot temperature" between about 115° C. and 120° C. When the temperature of the reaction mixture had cooled to 100° C., the resultant heteropolymer product was drawn off, separated from residual solution by centrifuging and dried to provide 35.7 pounds of heteropolymer for a yield of approximately 102%. By boiling point elevation procedure a molecular weight of 1680 was calculated for the product of this example.

EXAMPLE IV (INCREMENTAL)

Example III was repeated using p-cymene as the solvent in place of cumene. The temperature of the initial p-cymene charge was 132° C. and the temperature was maintained at 132–134° C. during the entire time of monomer-containing solution addition which was added at the rate of 0.5 gallon per minute, the total time of addition being about 35 minutes. 36.0 pounds of heteropolymer were recovered for a yield of 103%.

EXAMPLE V (INCREMENTAL MOLTEN MASS)

Example IV was repeated with the exception that the initial charge of p-cymene was at substantially the boiling point (about 176° C.) and the reaction kettle was fitted with a reflux condenser so that p-cymene vapors could be condensed and returned to the reaction mixture. The monomer-containing solution was added at the rate of about 3 gallons per minute, 15 gallons of solution being added within about 5 minutes, while the liquid reaction mixture boiled within the kettle. The reaction was substantially instantaneous. Following the addition of 15 gallons of monomer-containing solution to the kettle, the molten mass of heteropolymer product which had formed within the kettle was allowed to settle to the bottom of the kettle where it was drawn off. Some of the molten product adhered to the walls and agitator and after cooling it was scraped off and added to the remainder of the product. The molten product was allowed to cool to form a solid mass which was air dried and then broken up to form a particulate heteropolymer product. The yield was 111.5% indicative of complete reaction of styrene and maleic anhydride and also substantially complete termination of the heteropolymer by p-cymene. The residual liquid remaining in the kettle was suitable to either constitute the hot initial solvent medium in the kettle for a further batch (such procedure would normally be considered semi-continuous) or to be recycled for use in the preparation of fresh monomer-containing solution. In point of practice, part of the residual solvent liquid would be used to constitute hot initial charge while the remainder could be recycled to form fresh monomer-containing solution. By boiling point elevation procedure a molecular weight of 1238 was calculated for the product of this example.

To more specifically characterize the new copolymers of the invention, Table I compares viscosities of various copolymers prepared by reacting enmasse 1.5 mols of maleic anhydride and 1.5 mols of styrene, in the presence of 0.75 gram of benzoyl peroxide, in about 1200 grams of an organic solvent maintained with cooling at about 85° C. When the heat of polymerization is completely evolved, the solution is heated to 105° C. for 3 hours. Using benzene as solvent, the temperature was maintained at about 80° C., the reflux temperature. In the first column of the table there is indicated the organic solvent medium in which the copolymerization is carried out. In the second column there is indicated the comparative viscosity, measured in seconds, of a 10% by weight solution of the copolymer dissolved in pure acetone. The viscosity value of pure acetone is 19 seconds so that the viscosity values reported in seconds are meaningful so long as the solids content of the acetone solution is known and it is understood that the term "comparative viscosity" as used herein has reference to a viscosity value for pure acetone of 19 seconds.

Viscosity values in seconds were measured by timing the descent of a standard glass spherical "tear drop" through the solvent or the solution of the polymer in acetone contained in a standard glass tube—length 37¾", inside diameter—5/10". The glass "tear drop" has a diameter slightly less than the internal diameter of the tube. The temperature is controlled at 25° C.

*Table I*

| Solvent: | Comparative viscosity at 10% solids by weight, sec. |
|---|---|
| Benzene | 300 |
| Toluene | 46 |
| Toluene-naphtha (equal volumes) | 46 |
| Ethylbenzene | 27 |
| Cumene | 26 |

As will be evident, the solution viscosities of interest in the invention are very much lower than can be obtained with commonly used solvents other than those of the invention.

Using a composition of 100 grams of the polymer of Table I and 15 grams of ethylene glycol mixed by ball milling and molding the composition in a 7" x 7" x ⅛" steel plate mold at a temperature of 130–200° C., the mixtures containing the copolymer prepared in cumene and that prepared in ethylbenzene fused and flowed to completely fill the mold at a pressure of 10–20 pounds per square inch. Using the polymers of higher solution viscosity, the mixture did not flow well when heated to a temperature up to 200° C. and it could not be satisfactorily molded using pressures even substantially in excess of 100 p.s.i.

The solution viscosity picture is more fully shown in Table II which reports comparative viscosity for a 15% by weight solution in acetone and also presents viscosity data in centistokes.

*Table II*

| Solvent | Process | Temp. | Comparative Viscosity at 15% Solids, sec. | 10%[1] (Viscosity in Centistokes) |
|---|---|---|---|---|
| Ethylbenzene | Enmasse | Ex. I | 77.8 | 6.34 |
| Cumene | do | Ex. II | 60.8 | 5.43 |
| Ethylbenzene | Incremental | 136° C. (Reflux). | 23.0 | 0.86 |
| Cumene | do | 115–120° C. (Ex. III). | 22.2 | 0.772 |
| p-Cymene | do | 132° C. (Ex. IV). | 22.2 | 0.786 |
| Do | do | Reflux (Ex. V). | 21.1 | 0.72 |

[1] A solution of 10 grams of copolymer dissolved in acetone to form 100 milliliters of solution.

EXAMPLE VI

The ethylbenzene prepared copolymer of Example I is mixed very thoroughly with a glycol as shown below. Ball-milling of the mixture for 2–4 hours serves to provide a homogeneous solid mix. If a plasticizer is used, it is added to the copolymer and glycol and the three components are mixed together. The following formulations are illustrative; the abbreviation St/Ma designates the styrene-maleic anhydride copolymer of Example I.

(A) NO PLASTICIZER (a) 100 parts St/Ma+15 parts ethylene glycol—molded at 180° C. 10 p.s.i.—⅔ of 7″ x 7″ molding was fused. Barcol hardness—40.

(b) 100 parts St/Ma+23 parts 1,4-butanediol—molded at 180° C. 50 p.s.i.—partly fused. Barcol hardness—50.

(c) 100 parts St/Ma+27 parts diethylene glycol—molded at 180° C. 20 p.s.i.—completely fused. Barcol hardness—25–30.

(d) 100 parts St/Ma+19 parts propylene glycol—molded at 180° C. 50 p.s.i.—fused and translucent. Barcol hardness—30–40.

(e) 150 parts St/Ma+75 parts polyethylene glycol (Carbowax 200)—molded at 150° C.—10 p.s.i.—completely fused. Barcol hardness—18–22.

(f) 100 parts St/Ma+26 parts neopentyl glycol—molded at 180° C. 100 p.s.i.—completely fused. Barcol hardness—40–45.

(g) 100 parts St/Ma+38.3 parts neopentyl glycol—molded at 180° C. 50 p.s.i.—completely fused. Barcol hardness—45–50.

(h) 100 parts St/Ma+30 parts trimethylol ethane—molded at 170° C. 790 p.s.i.—fused and translucent. Barcol hardness—50—55.

(i) 100 parts St/Ma+34 parts trimethylol propane—molded at 170° C. 600 p.s.i.—completely fused. Barcol hardless—45.

(B) NON-REACTIVE PLASTICIZERS

The compositions in (a) to (i) are mixed with the following plasticizers. The amounts may vary from about 5% to 75% ore more, and molded as above except that lower pressures are usually required to give the same flow at higher plasticizer content.

Each of the plasticizers were used in an amount of 14 parts of plasticizer to 130 parts of No. (h) above. Each was found to flow readily for molding and rapid curing at 50 p.s.i. and 170° C.

Cyclohexanone
Butyrolactone
Acetophenone
Isophorone
2,3-butylene glycol
Acetonaphthone, and
Dimer of methyl isopropenyl ketone The 2,3-butylene glycol employed is itself slowly reactive and also exhibits a favorable plasticizer action.

A composition containing 100 parts of cumene solvent polymerized styrene-maleic anhydride copolymer and 30 parts of trimethylol ethane plasticized with about 10–20 parts of acetophenone can be molded at about 50 p.s.i. as compared to 790 p.s.i. which is required when no plasticizer is used.

(C) SALT FORMING PLASTICIZERS—AMIDE TYPE

The following molding compositions were formulated and weighed samples were tested for seven (7) days in contact (immersion) with the specified test reagents listed in Table III below.

Sample No. 500 in Table III consisted of 100 parts styrene-maleic anhydride, 30 parts trimethylol propane (TME) and 14 parts of dimethyl formamide.

Sample No. 502 in Table III consisted of 100 parts of styrene-maleic anhydride, 20 parts trimethylol ethane and 14 parts of dimethyl formamide.

Sample No. 572 consisted of 100 parts of styrene-maleic anhydride, 26 parts of neopentyl glycol (NEO) and 15 parts of dimethyl formamide.

The test results after seven days exposure are tabulated in Table III, expressed as percentage weight gain.

*Table III*

|  | No. 500 | No. 502 | No. 572 |
|---|---|---|---|
| Molding Cond | 170° C., 50 p.s.i. | 170° C., 50 p.s.i. | 180° C., 50 p.s.i. |
| Barcol Hardness | 48–54 | 30–48 | 37–42 |
| Water | | | +5% |
| $H_2O_2$, 3% | +10% | +9% | +4% |
| NaCl, 10% | +6% | +4% | +2% |
| NaOH, 1% | +15% | +11% | +16% |
| $H_2SO_4$, 3% | +7% | +7% | +4% |
| $H_2SO_4$, 30% | +3% | +2% | +1% |
| HCl, 10% | +5% | +3% | +2% |
| $HNO_3$, 10% | +7% | +6% | +3% |
| Acetic acid, 5% | +8% | +8% | +4% |

(D) METHYL HYDROGEN MALEATE PLASTICIZER

A molding powder was made by ball-milling 100 parts styrene-maleic anhydride +30 parts trimethylol ethane +15 parts of methyl hydrogen maleate for three hours. A 7″ x 7″ x ⅛″ plate was molded (designated No. 348) at 180° C./50 p.s.i. This plate No. 348 was clear, transparent, had a Barcol hardness of 60 and showed the following absorption data expressed as percentage weight change when weighed samples were immersed in the specified reagents for seven days:

Test reagent: Absorption, percent
Water _____ +4
3% $H_2O_2$ _____ +4
10% NaCl _____ +2
1% NaOH _____ −1
10% NaOH _____ Attacked
3% $H_2SO_4$ _____ +3
30% $H_2SO_4$ _____ +1
10% HCl _____ +1
10% $HNO_3$ _____ +2
5% acetic acid _____ +3
5% phenol _____ +5

Example VI was repeated using the copolymers of Examples III, IV and V. In each instance, the results were substantially as indicated in Example VI, the lower solution viscosity copolymers of Examples III–V providing improved flow at lower molding pressures.

The invention is defined in the claims which follow.

I claim:

1. A composition comprising a mixture of separate reactive components containing as the essential resin ingredient, a normally solid copolymer of styrene and maleic anhydride copolymerized in molar proportions of from 1:2 to 2:1 having a solution viscosity in 10% solution in acetone of up to 7 centistokes and as the cross-linking agent for said copolymer and aliphatic polyhydric alcohol which is reactive in situ with said copolymer at a temperature above about 130° C.

2. A composition as recited in claim 1 in which said coplymer and said polyhydric alcohol are present in said mixture in substantially equal molecular reacting proportions.

3. A composition as recited in claim 1 in which said copolymer melts unsharply over a range of up to 15° C.

4. A composition comprising a mixture of separate reactive components containing as the essential resin ingredient, a normally solid copolymer of styrene and maleic anhydride copolymerized in molar proportions of from 1:2 to 2:1 having a solution viscosity in 10% solution in acetone of up to 7 centistokes, said copolymer being terminated by an organic compound comprising a monocyclic hydrocarbon nucleus of six carbon atoms substituted with at least one alkyl radical containing at least two carbon atoms and in which the alpha carbon atom of the alkyl radical contains at least one hydrogen substituent, and as the cross-linking agent for said copolymer an aliphatic polyhydric alcohol which is reactive in situ with said copolymer at a temperature above about 130° C.

5. A composition as recited in claim 4 in which said copolymer has a melting point of less than 225° C.

6. A composition as recited in claim 4 in which said copolymer is terminated by an isopropyl substituted benzene.

7. A composition as recited in claim 6 in which said copolymer contains from 2–12% by weight of said isopropyl substituted benzene.

8. A composition comprising a mixture of separate reactive components containing as the essential resin ingredient, a normally solid copolymer of styrene and maleic anhydride copolymerized in molar proportions of from 1:2 to 2:7 having a solution viscosity in 10% solution in acetone of up to 1 centistoke and as the cross-linking agent for said copolymer as aliphatic polyhydric alcohol which is reactive in situ with said copolymer at a temperature above about 130° C.

9. A composition as recited in claim 8 in which said copolymer melts unsharply at a temperature of less than 225° C.

10. A composition as recited in claim 8 in which said copolymer is terminated by from 2 to about 12% by weight of an organic compound comprising a monocyclic hydrocarbon nucleus of six carbon atoms substituted with at least one alkyl radical containing at least two carbon atoms and in which the alpha carbon atom of the alkyl radical contains at least one hydrogen substituent.

11. A composition adapted for molding at temperatures of about 130° C. to about 210° C. and at low pressures varying from about 10 to about 100 pounds per square inch comprising a mixture of separate reactive components containing as the essential resin ingredient, a normally solid copolymer of styrene and maleic anhydride copolymerized in molar proportions of from 1:2 to 2:1 having a solution viscosity in 10% solution in acetone of up to 1 centistoke and as the cross-linking agent for said copolymer a substantially equal molecular reacting propertion of aliphatic polyhydric alcohol which is reactive in situ with said copolymer at a temperature above about 130° C.

12. A molding composition as recited in claim 11 in which said aliphatic polyhydric alcohol is a normally solid alcohol.

13. A molding composition as recited in claim 11 in which said polyhydric alcohol is trimethylol ethane.

14. A molding composition as recited in claim 11 in which said polyhydric alcohol is trimethylol propane.

15. A molding composition as recited in claim 11 in which said polyhydric alcohol is neopentyl glycol.

16. A molding composition as recited in claim 11 in which said polyhydric alcohol is 1,4-butanediol.

17. A molding composition as recited in claim 11 in which said copolymer contains substantially equal proportions of styrene and maleic anhydride.

18. A composition adapted for molding at temperatures of about 130° C. to about 210° C. and at low pressures varying from about 10 to about 100 pounds per square inch comprising a mixture of separate reactive components containing as the essential resin ingredient, a normally solid copolymer of styrene and maleic anhydride in molar proportions of from 1:2 to 2:1 having a solution viscosity in 10% solution in acetone of up to 7 centistokes and as the cross-linking agent for said copolymer a substantially equal molecular reacting proportion of aliphatic polyhydric alcohol which is reactive in situ with said copolymer at a temperature above about 130° C., said composition being plasticized with a plasticizer in which said composition is soluble.

19. A molding composition as recited in claim 18 in which said plasticizer is an amide.

20. A molding composition as recited in claim 18 in which said plasticizer is a half ester of a dicarboxylic aliphatic acid and a monohydric alcohol.

21. A solution comprising an organic solvent having dissolved therein a mixture of separate reactive components containing as the essential resin ingredient, a normally solid copolymer of styrene and maleic anhydride copolymerized in molar proportions of from 1:2 to 2:1 having a solution viscosity in 10% solution in acetone of up to 1 centistoke and as the cross-linking agent for said copolymer an aliphatic polyhydric alcohol which is reactive in situ with said copolymer at a temperature above about 130° C.

22. The resinous reaction product of a normally solid copolymer of styrene and maleic anhydride copolymerized in molar proportions of from 1:2 to 2:1 having a solution viscosity in 10% solution in acetone of up to 7 centistokes and an aliphatic polyhydric alcohol cross-linking said copolymer.

23. A resinous reaction product as recited in claim 22 in which said copolymer contains substantially equimolar proportions of styrene and maleic anhydride.

24. A resinous reaction product as recited in claim 22 in which said copolymer is terminated by an organic compound comprising a monocyclic hydrocarbon nucleus of six carbon atoms substituted with at least one alkyl radical containing at least two carbon atoms and in which the alpha carbon atom of the alkyl radical contains at least one hydrogen substituent.

25. A resinous reaction product as recited in claim 24 in which said copolymer is terminated by from 2–12% by weight of said organic compound.

26. A resinous reaction product as recited in claim 24 in which said copolymer is terminated by ethylbenzene.

27 A resinous reaction product as recited in claim 24 in which said copolymer is terminated by cumene.

28. A resinous reaction product as recited in claim 24 in which said coplymer is terminated by cymene.

References Cited in the file of this patent

UNITED STATES PATENTS

| Re. 23,514 | Voss et al. | June 24, 1952 |
| 2,286,062 | Condo et al. | June 9, 1942 |
| 2,313,728 | Austin et al. | Mar. 16, 1943 |
| 2,389,379 | McCulloch | Nov. 20, 1945 |
| 2,392,139 | Gerhart | Jan. 1, 1946 |
| 2,870,128 | Sellers | Jan. 20, 1959 |

OTHER REFERENCES

Flory: "Principles of Polymer Chemistry," Cornell University Press, 1953, pages 141–145.

UNITED STATES PATENT OFFICE
CERTIFICATE OF CORRECTION

Patent No. 3,085,986                                    April 16, 1963

Irving E. Muskat

It is hereby certified that error appears in the above numbered patent requiring correction and that the said Letters Patent should read as corrected below.

Column 3, line 6, for "vessell" read -- vessel --; line 74, for "halogen," read -- halogen- --; column 11, line 43, for "ore" read -- or --; column 12, line 58, for "and" read -- an --; column 13, line 18, for "2:7" read -- 2:1 --; line 20, for "as" read -- an --; line 43, for "propertion" read -- proportion --.

Signed and sealed this 21st day of January 1964.

(SEAL)
Attest:

ERNEST W. SWIDER

Attesting Officer

EDWIN L. REYNOLDS

Acting Commissioner of Patents